(12) United States Patent
Marunouchi

(10) Patent No.: US 8,619,298 B2
(45) Date of Patent: Dec. 31, 2013

(54) METHOD OF NOTIFYING JOB STATUS IN IMAGE FORMING APPARATUS

(75) Inventor: Kaori Marunouchi, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 342 days.

(21) Appl. No.: 13/050,076

(22) Filed: Mar. 17, 2011

(65) Prior Publication Data

US 2011/0261397 A1 Oct. 27, 2011

Related U.S. Application Data

(60) Provisional application No. 61/327,134, filed on Apr. 23, 2010.

(51) Int. Cl.
*G06F 3/12* (2006.01)
*G06K 15/00* (2006.01)

(52) U.S. Cl.
USPC .......................................... 358/1.15; 358/1.14

(58) Field of Classification Search
None
See application file for complete search history.

(56) References Cited

U.S. PATENT DOCUMENTS

| 6,522,421 | B2* | 2/2003 | Chapman et al. | 358/1.15 |
| 8,081,332 | B2* | 12/2011 | Nagarajan et al. | 358/1.15 |
| 8,179,549 | B1* | 5/2012 | Evans | 358/1.15 |
| 2002/0131070 | A1* | 9/2002 | Housel et al. | 358/1.15 |
| 2012/0057189 | A1* | 3/2012 | Deroller | 358/1.15 |

FOREIGN PATENT DOCUMENTS

JP 2004276318 10/2004

\* cited by examiner

*Primary Examiner* — Dov Popovici
(74) *Attorney, Agent, or Firm* — Turocy & Watson, LLP

(57) ABSTRACT

According to one embodiment, an image forming apparatus includes a job registering unit, an address setting unit, a control unit, a detecting unit, and a transmitting unit. The job registering unit registers a job. The address setting unit sets an electronic mail address to be set as a transmission destination of a status concerning the job registered in the job registering unit. The control unit executes the job registered in the job registering unit. The detecting unit detects the status concerning the job executed by the control unit. The transmitting unit transmits an electronic mail including the status of the job detected by the detecting unit to the electronic mail address set by the address setting unit.

15 Claims, 12 Drawing Sheets

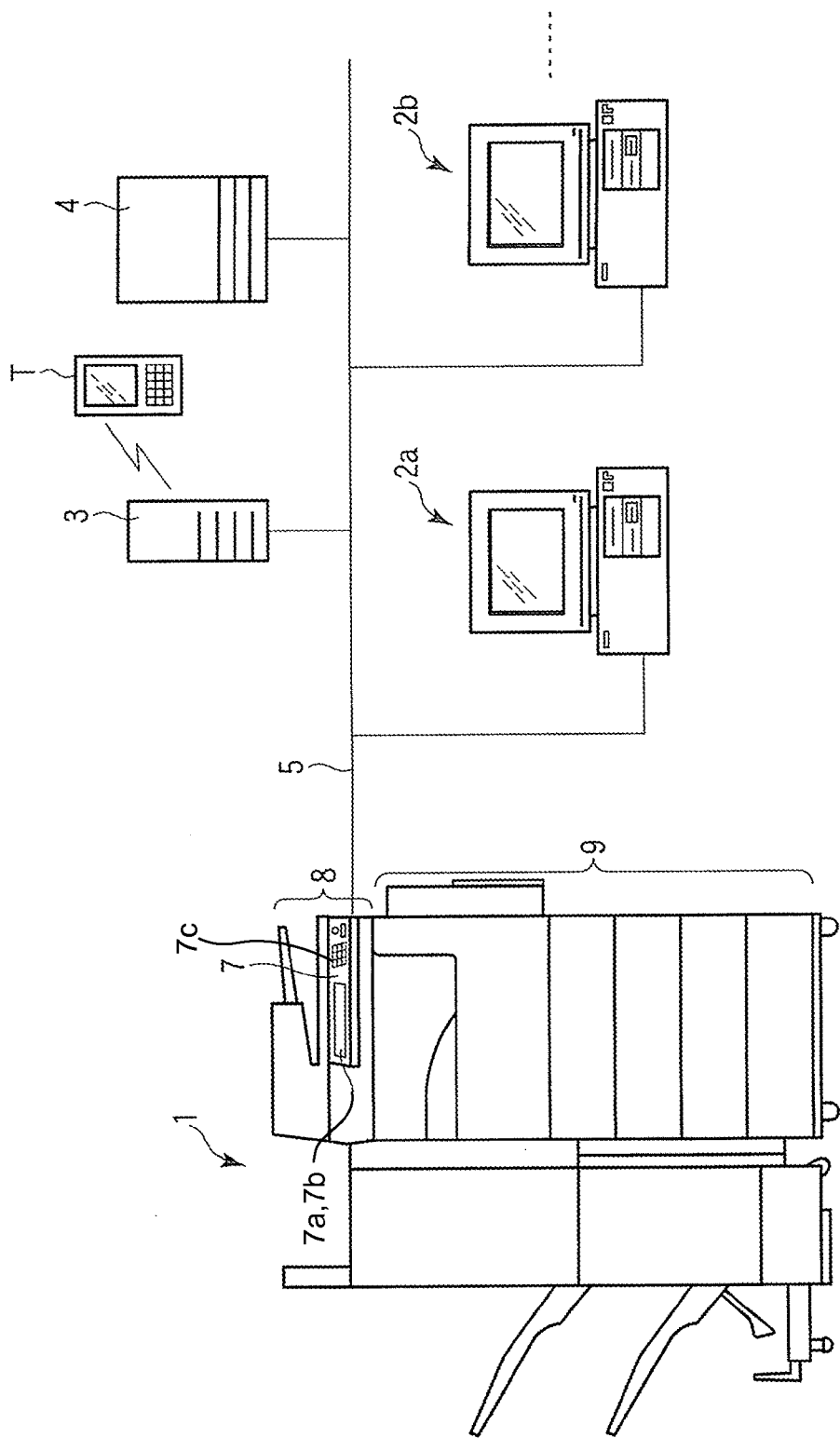
F I G. 1

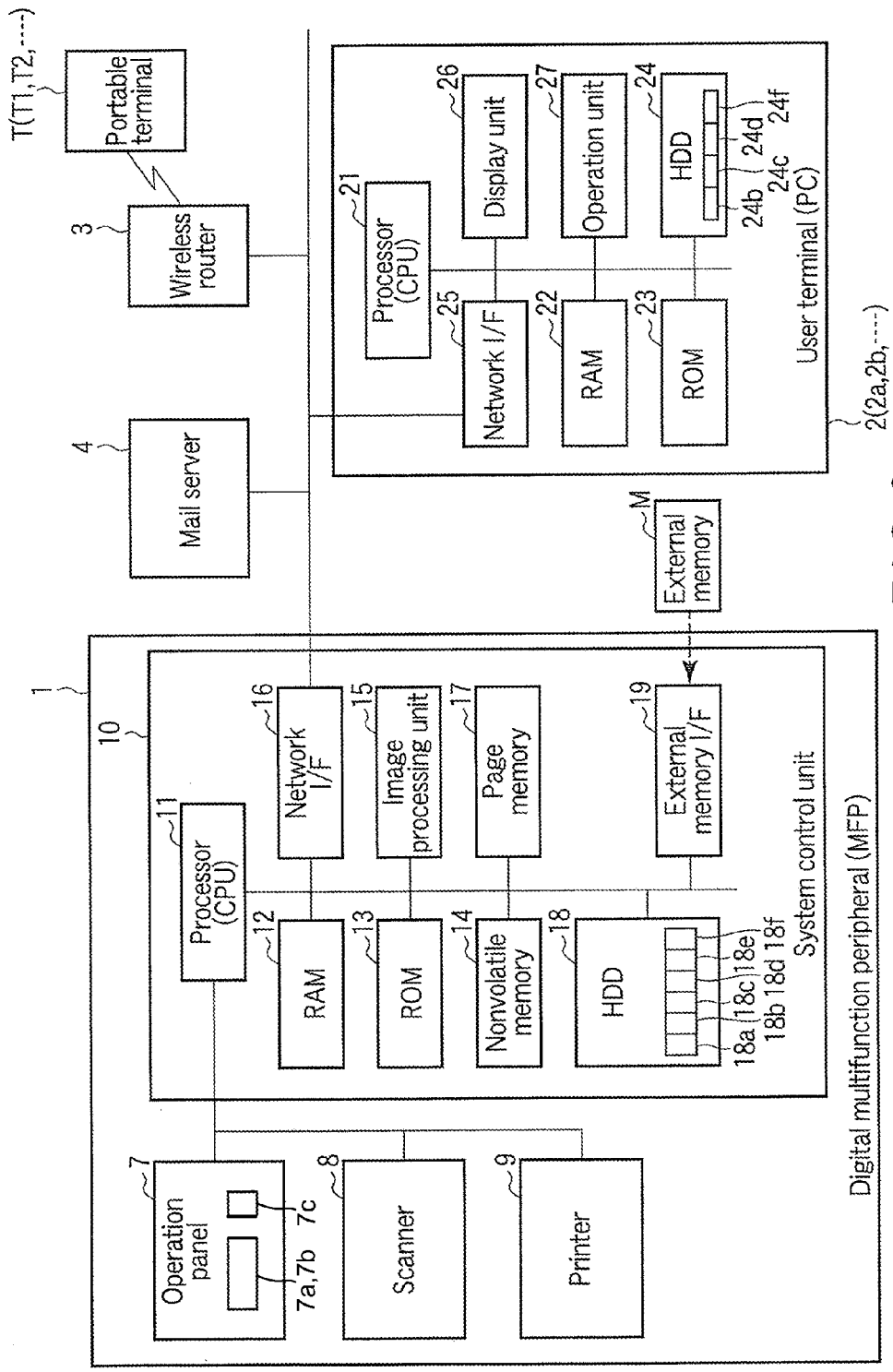
F I G. 2

Detailed setting of job status

| | Notify | Not notify |
|---|---|---|
| Spooling | ☑ | ☐ |
| Printing started (job started) | ☑ | ☐ |
| Printing completed (job completed) | ☑ | ☐ |
| Interruption occurred | | |
|     Sheet jam | ☑ | ☐ |
|     Cover open | ☐ | ☑ |
|     Lack of sheets | ☑ | ☐ |
|     Lack of toner | ☑ | ☐ |
| Interruption release | ☑ | ☐ |
| Cancelling | ☐ | ☑ |
| Cancellation completed | ☑ | ☐ |
| Forcibly deleted | ☑ | ☐ |

( Default setting )  ( OK )  ( Cancel )

FIG. 5

| | Content of job ~18e | | | |
|---|---|---|---|---|
| | Copying | | Printing | |
| | Color | Monochrome | Color | Monochrome |
| User A | Transmission destination: aaaaa, bbbbbb<br>Status: Default<br>Transmission data: Default | Transmission destination: bbbbbb<br>Status: Only interruption<br>Transmission data: Default | Transmission destination: aaaaa<br>Status: Interruption, end<br>Transmission data: Default | Not transmit |
| User B | Transmission destination: ccccc, bbbbb<br>Status: Default<br>Transmission data: Default | Transmission destination: bbbbbb<br>Status: Only interruption<br>Transmission data: Default | Transmission destination: ccccc, bbbbb<br>Status: Only interruption<br>Transmission data: Default | Not transmit |

F I G. 9

| User name | Registration date and time | Email address of destination | Setting content |
|---|---|---|---|
| User A | 2010/11/11 11:11 | Address 1: aaaaa<br>Address 2: bbbbbb | Status: Interruption, end<br>Transmission data: Default |
| User B | 2010/11/10 10:10 | Address 1: aaaaa<br>Address 2: bbbbbb<br>Address 3: ccccc | Status: Default<br>Transmission data: Default |

Setting history (transmission history) ~18f

F I G. 10

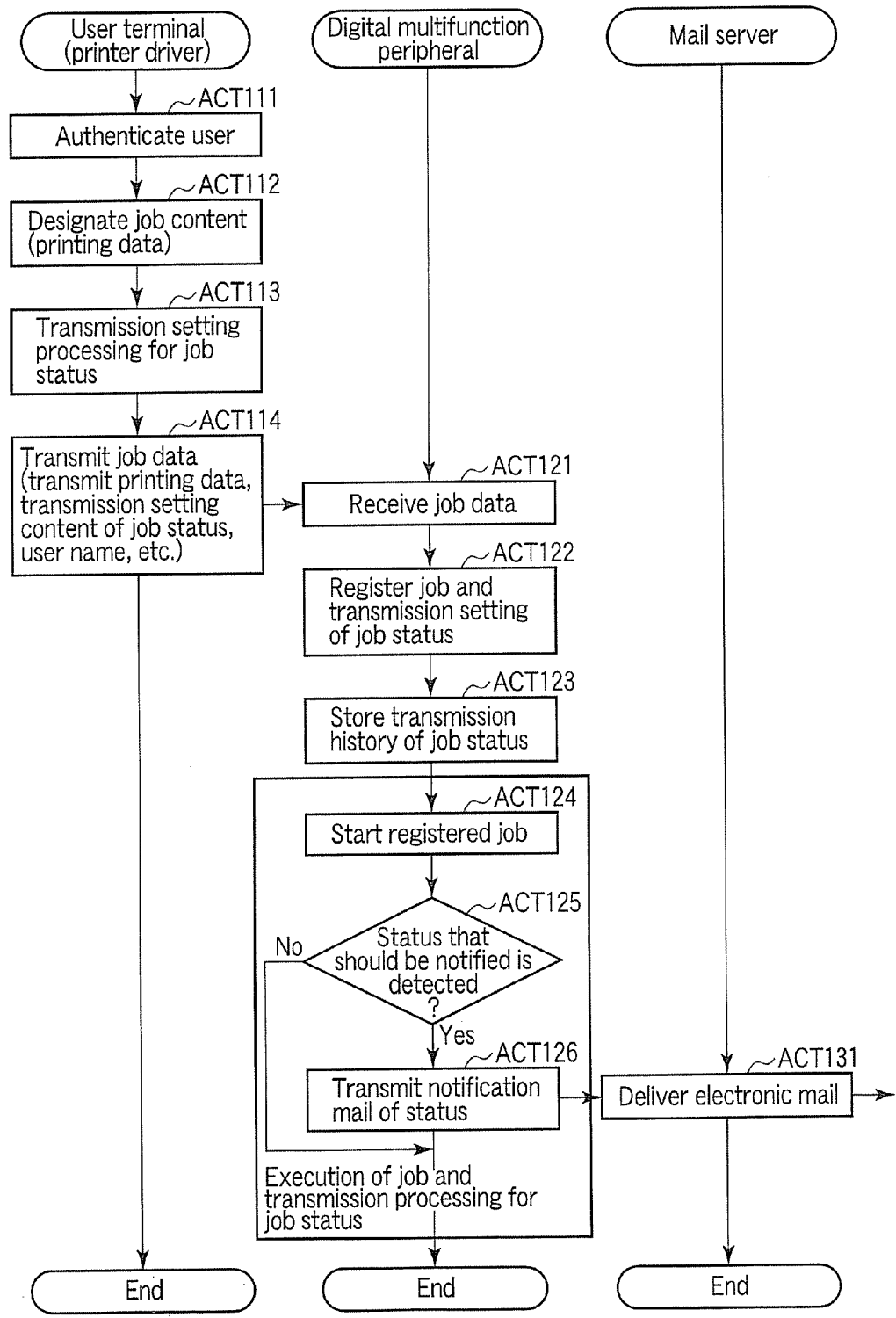
F I G. 12

METHOD OF NOTIFYING JOB STATUS IN IMAGE FORMING APPARATUS

CROSS-REFERENCE TO RELATED APPLICATIONS

This application is based upon and claims the benefit of priority from U.S. Provisional Application No. 61/327,134 filed on Apr. 23, 2010; the entire contents of which are incorporated herein by reference.

FIELD

Embodiments described herein relate generally to an image forming apparatus, an image forming system, and a method of notifying a job status in the image forming apparatus.

BACKGROUND

In the past, an image forming apparatus such as a digital multifunction peripheral manages processing such as copying and printing in a job unit. Some digital multifunction peripheral has a function of displaying a status of a job on a display unit. However, to check the job status, a user himself or herself has to actually go to a setting place of the digital multifunction peripheral and operate an operation panel.

BRIEF DESCRIPTION OF THE DRAWINGS

FIG. 1 is a schematic diagram of a configuration example of an image forming system;

FIG. 2 is a block diagram of a configuration example of control systems in a digital multifunction peripheral and a user terminal;

FIG. 5 is a diagram of a display example of a detailed setting screen for the job status;

FIG. 9 is a diagram of an example of data stored in a user setting table;

FIG. 10 is a diagram of an example of a transmission history of job statuses stored in a setting history database;

FIG. 12 is a flowchart for schematically explaining a flow of processing performed when a user terminal performs transmission setting for a job status.

DETAILED DESCRIPTION

Figure 3:
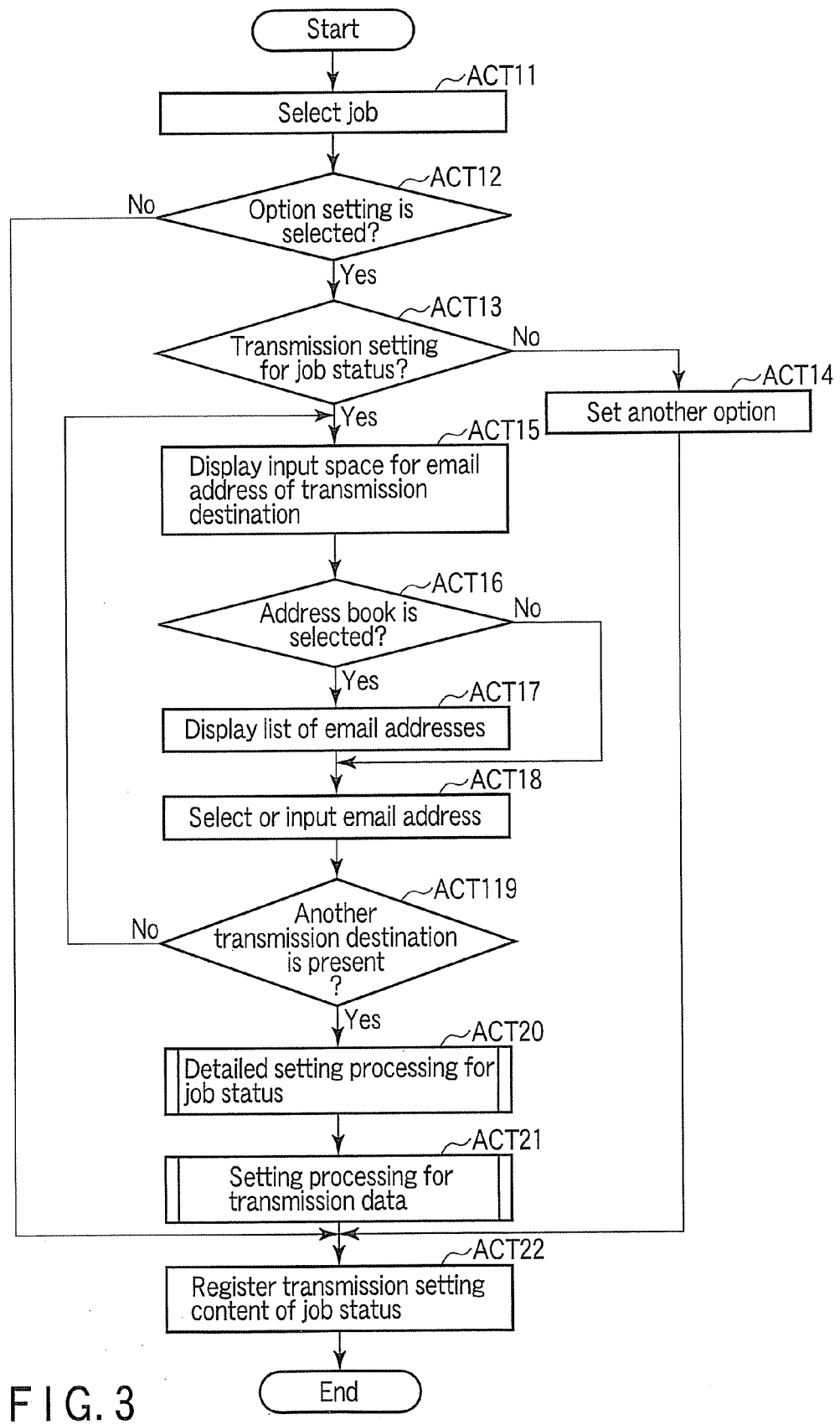
FIG. 3 is a flowchart for explaining a flow of transmission setting processing for a job status in the digital multifunction peripheral.

In general, according to one embodiment, an image forming apparatus includes a job registering unit, an address setting unit, a control unit, a detecting unit, and a transmitting unit. The job registering unit registers a job. The address setting unit sets an electronic mail address to be set as a transmission destination of a status concerning the job registered in the job registering unit. The control unit executes the job registered in the job registering unit. The detecting unit detects the status concerning the job executed by the control unit. The transmitting unit transmits an electronic mail including the status of the job detected by the detecting unit to the electronic mail address set by the address setting unit.

An embodiment is explained in detail below with reference to the accompanying drawings.

FIG. 1 is a schematic diagram of a configuration example of an image forming system.

As shown in FIG. 1, the image forming system includes a digital multifunction peripheral 1, a user terminal 2, a wireless router 3, and a mail server 4. The image forming system is a system in which the digital multifunction peripheral 1, the user terminal 2, the wireless router 3, and the mail server 4 are connected by a local area network 5.

The digital multifunction peripheral (MFP) 1 functions as an image forming apparatus (a printing apparatus). The digital multifunction peripheral 1 has a scanner function, a printer function, a network function, and the like. The digital multifunction peripheral 1 has a communication function for performing data communication with the apparatuses (the user terminal 2, the wireless router 3, and the mail server 4) via the local area network 5. For example, the digital multifunction peripheral 1 functions as a network printer and executes print processing requested by the user terminal 2 or a portable terminal T. The digital multifunction peripheral 1 also has a function of transmitting an electronic mail (email) to the user terminal 2 or the portable terminal T via the local area network 5.

The user terminal 2 is a terminal apparatus used by a user. The user terminal 2 has a communication function for performing data communication with the digital multifunction peripheral 1 or the mail server 4 via the local area network 5. The user terminal 2 is, for example, a personal computer. The user terminal 2 may have a wireless communication function for communication with the wireless router 3. In this case, the user terminal 2 is configured to be capable of communicating with the digital multifunction peripheral 1 and the mail server 4 via the wireless router 3 and the local area network 5. The user terminal 2 may be the portable terminal T.

The wireless router 3 is a router for performing wireless communication. The wireless router 3 is connected to the portable terminal T, which has the wireless communication function, by wireless communication. The portable terminal T is capable of communicating with the digital multifunction peripheral 1 and the mail server 4 via the wireless router 3 and the local area network 5. The portable terminal T is, for example, a portable apparatus carried by each user. The portable terminal T has a function of transmitting and receiving electronic mails to and from the digital multifunction peripheral 1 or the user terminal 2 via the mail server 4. The user carrying the portable terminal T can receive an electronic mail anywhere in a wireless communication range. The portable terminal T may be configured to be capable of functioning as the user terminal 2 by installing a printer driver for the digital multifunction peripheral 1.

The configuration of the digital multifunction peripheral 1 is schematically explained below.

As shown in FIG. 1, the digital multifunction peripheral 1 includes an operation panel 7, a scanner (an image reading unit) 8, and a printer (an image forming unit) 9. The digital multifunction peripheral 1 also includes various external interfaces for inputting and outputting image data. The digital multifunction peripheral 1 functions as a copying machine, a scanner, a printer, or a network communication machine.

The scanner 8 reads an image on a document surface as color image data or monochrome image data. The scanner 8 reads the image on the document surface by optically scanning the document surface. The scanner 8 includes a scanning mechanism, a photoelectric conversion unit, and a document feeder (ADF).

The printer 9 forms a color image or a monochrome image on a sheet. The printer 9 is, for example, an image forming apparatus of an electrophotographic system. However, the printer 9 is not limited to the electrophotographic system and may perform image formation with a printing system such as an ink-jet system or a thermal transfer system.

The printer 9 includes a sheet storing unit, a conveying mechanism, an exposing device, a photoconductive drum, a developing device, a transfer belt, a transfer device, and a fixing device. In the printer 9, the conveying mechanism conveys a sheet set in the sheet storing unit. The exposing device forms a latent image on the photoconductive drum. The developing device develops the latent image on the photoconductive drum with a toner (in the case of color printing, toners of colors). The transfer device transfers a toner image on the photoconductive drum developed by the developing device onto a sheet via the transfer belt. The fixing device fixes the toner image on the sheet by, for example, heating the sheet in a pressed state. The conveying mechanism outputs, as a printing result, the sheet having the toner image fixed thereon.

The printer 9 includes various sensors configured to detect operation states in the units. For example, sensors provided in the conveying mechanism, a conveying path, and the like detect a sheet jam and the like. A sensor provide in the sheet storing unit detects presence or absence of sheets (lack of sheets) in the sheet storing unit. The developing device includes a sensor configured to detect presence or absence of a toner (lack of a toner). Opening and closing states of a cover of a housing are detected by an opening and closing detection sensor.

The operation panel 7 is a user interface. The operation panel 7 includes, for example, a display unit 7a including a touch panel 7b and various operation keys 7c. The operation panel 7 functions as an operation unit with which a user inputs an operation instruction and a display unit configured to display guidance and the like for the user.

The configuration of a control system in the digital multifunction peripheral 1 is explained below.

FIG. 2 is a block diagram of a configuration example of control systems in the digital multifunction peripheral 1 and the user terminal 2.

As shown in FIG. 2, the digital multifunction peripheral 1 includes a system control unit 10 configured to collectively controls the units of the digital multifunction peripheral 1. For example, the system control unit 10 controls the scanner 8 and the printer 9. The system control unit 10 acquires information input by the user with the operation panel 7. The system control unit 10 acquires information from the user terminal 2 or the portable terminal T via a network.

The system control unit 10 includes a processor (CPU) 11, a random access memory (RAM) 12, a read only memory (ROM) 13, a nonvolatile memory 14, an image processing unit 15, a network interface 16, a page memory 17, a hard disk drive (HDD) 18, and an external memory interface 19.

The processor 11 is, for example, a CPU. The processor 11 realizes various processing functions by executing a control program stored in the ROM 13, the nonvolatile memory 14, or the HDD 18. The RAM 12 is a main memory functioning as a working memory. The ROM 13 has stored therein a control program, control data, and the like for managing the operation of the digital multifunction peripheral 1. The nonvolatile memory 14 is a rewritable nonvolatile memory. The nonvolatile memory 14 has stored therein a control program, control data, and the like for realizing the various processing functions.

The image processing unit 15 subjects image data read by the scanner 8, image data received through a network, image data input from an external memory, or the like to image processing. The network interface 16 is an interface for performing communication with an external apparatus via the local area network 5. The page memory 17 is a memory having a storage area in which image data for at least one page is expanded. The external memory interface 19 is an interface for locally connecting the external memory. For example, the external memory interface 19 inputs image data for print from an external memory M.

The HDD 18 is a large-capacity memory for data storage. The HDD 18 stores, for example, image data to be printed. The HDD 18 includes a job table 18a, an address book 18b, a status setting table 18c, a transmission data setting table 18d, a user setting table 18e, and a setting history database 18f. These tables 18a to 18e may be provided in the nonvolatile memory 14.

The job table 18a registers jobs that the digital multifunction peripheral should execute. The job table 18a stores, for each of the jobs, for example, information indicating content of the job and transmission setting information of a job status concerning the job. The address book 18b stores an electronic mail address (email address) that can be designated as a transmission destination of the job status. The address book 18b may be an address book in which a set email address of each user specified by user authentication processing is stored.

The status setting table 18c stores, for example, information indicating items that can be notified as a job status and default setting information of the job status. In the status setting table 18c, for example, default setting of a job status may be set for each type of a job (copying, printing, scanning, etc.).

The transmission data setting table 18d stores items of data that can be transmitted together with a job status (information that can be attached to a job status) and default setting information of transmission data. In the transmission data setting table 18d, for example, default setting of information attached to a job status may be set for each type of a job (copying, printing, scanning, etc.). The user setting table 18e stores transmission setting information of job statuses in association with users. The user setting table 18e may store transmission setting of job statuses for each type of a job with respect to the users.

The setting history database 18f stores, as history information (a transmission history), transmission setting contents of statuses of jobs executed by the users (email addresses of transmission destinations, detailed setting of job statuses, and setting of transmission data).

The configuration of the user terminal 2 is explained below.

In the configuration example shown in FIG. 2, the user terminal 2 includes a processor (a CPU) 21, a RAM 22, a ROM 23, a HDD 24, a network interface (I/F) 25, a display unit 26, and an operation unit 27.

The processor 21 is, for example, a CPU. The processor 21 manages control of the entire user terminal 2. The processor 21 realizes various processing functions by executing a computer program stored in the ROM 23 or the HDD 24. The RAM 22 is a working memory. The ROM 23 has stored therein a control program and control data for managing the basic operation of the user terminal 2.

The processor 21 is capable of performing various kinds of control for the digital multifunction peripheral 1 by executing a printer driver program for the digital multifunction peripheral 1 installed in the HDD 24. For example, the processor 21 requests, with the printer driver, the digital multifunction peripheral 1 to perform a job such as printing of an image. The printer driver requests the digital multifunction peripheral 1 to execute a creating function for a job and a transmission setting function for a job status concerning the created job that the processor 21 requests the digital multifunction peripheral 1 to execute. The processor 21 also has, for example, a function of transmitting and receiving emails by executing a computer program for email.

The HDD 24 is a storage device for data storage. The HDD 24 includes an address book 24b, a status setting table 24c, a transmission data setting table 24d, and a setting history database 24f. The address book 24b stores email addresses that can be set as transmission destination of job statuses by a user of the user terminal 2. The address book 24b may be an address book provided from the system and stored in the mail server 4 or the like or may be an address book for the user of the user terminal 2 created by the user.

The status setting table 24c stores, for example, default setting information of job statuses for the user. The transmission data setting table 24d stores default setting information of transmission data for the user. Transmission setting (email addresses of transmission destinations, detailed setting of job statuses, and setting of transmission data) of job statuses executed in the user terminal 2 by the user may be stored in the setting history database 24f as history information (a transmission history).

The network interface 25 is an interface for performing data communication with apparatuses in the local area network 5. The processor 21 requests, via the network interface 25, the digital multifunction peripheral 1 to perform printing and transmits print data to the digital multifunction peripheral 1. The processor 21 also has a function of transmitting and receiving electronic mails via the network interface 25. The display unit 26 is a display device. The operation unit 27 is an input device such as a keyboard and a pointing device.

Registration of a job and transmission setting processing for a job status in the digital multifunction peripheral 1 are explained below.

First, registration processing for a job and transmission setting processing for a job status by operation of the operation panel 7 in the digital multifunction peripheral 1 are explained.

In the digital multifunction peripheral 1, a user instructs processing (a job) such as copying, scanning, direct printing from the external memory M, and facsimile with the operation panel 7. The system control unit 10 registers, as jobs, processing contents instructed by operation of the operation panel 7. The system control unit 10 sequentially executes the registered jobs. For example, when copying is executed, the user selects a copying function with the operation panel 7 and sets content of copying processing. Then, the system control unit 10 registers, as jobs, the copy processing input by the user and sequentially executes the jobs.

FIG. 3 is a flowchart for explaining an example of transmission setting processing for a job status by operation of the operation panel 7.

The user selects desired processing content with the operation panel 7. The processor 11 of the system control unit 10 registers, as a job, the processing content designated by the user with the operation panel 7 in the job table 18a (ACT 11). Concerning the job of the designated processing content, transmission setting for a job status by the operation panel 7 is possible. The transmission setting for a job status can be set as, for example, one of options for the job.

Specifically, in selecting a job, a user who desires transmission of a job status selects option setting for the job with the operation panel 7. If the option setting for the job is selected (YES in ACT 12), the processor 11 of the system control unit 10 determines whether the transmission setting for a job status is selected (ACT 13). If setting other than the transmission setting for a job status is selected, the processor 11 sets, as appropriate, an option designated by the user with the operation panel 7 (ACT 14).

If the transmission setting for a job status is selected (NO in ACT 13), the processor 11 performs, for example, setting of a transmission destination, setting of an item transmitted as the job status (detailed setting of the job status), and setting of transmission data.

First, the processor 11 displays, as setting of a transmission destination of the job status, an input space for an email address set as the transmission destination on the display unit 7a of the operation panel 7 (ACT 15). Plural input spaces for email addresses may be displayed on the display unit 7a. An email address set in default may be displayed in the input space for an email address. If a user can be specified by user authentication processing or the like, default setting associated with the user may be displayed in the input space for an email address.

The processor 11 displays a selection key for an address book selectable by the touch panel 7b together with the input space for an email address of a transmission destination. If the user selects the selection key for an address book (YES in ACT 16), the processor 11 displays a list of selectable email addresses included in the address book on the display unit 7a (ACT 17). If the list of email addresses selectable as transmission destinations is displayed from the address book, the user selects, with the touch panel 7b, an email address to be set as a transmission destination from the displayed list of email addresses (ACT 18).

The user may directly input an email address to the input space for an email address displayed on the display unit 7a. For example, characters, signs, and the like as the email address can be input by hard keys provided on the operation panel 7 or the touch panel 7b. If the characters and the signs as the email address are directly input to the input space for an email address, the processor 11 sets, as an email address of a transmission destination, a string of the characters and the signs input to the input space for an email address (ACT 18).

The job status can be transmitted to plural destinations. If there is another transmission destination (the next transmission destination) as a transmission destination of the job status (YES in ACT 19), the processor 11 sets an email address to be set as the next transmission destination. Specifically, the processor 11 repeatedly executes ACTS 15 to 19 to thereby set email addresses for all destinations.

If the setting processing for a transmission destination of the job status ends, the processor 11 performs detailed setting processing for the job status (ACT 20). In the detailed setting processing for the job status, the processor 11 sets in detail, for example, items that should be transmitted as the job status. As items that can be set as the job status, presence or absence of notification concerning not only printing end (job end) but also printing start (job start), printing interruption occurrence (job interruption occurrence), printing resumption (job interruption release), cancellation, and forcible deletion can be set. Printing interruption may be set for each cause of interruption.

If the detailed setting of the job status ends, the processor 11 performs setting processing for transmission data of the job status (ACT 21). In the setting processing for transmission data, the processor 11 sets data and the like attached to the job status. As the data attached to the job status, attachment of not only a name of a user who requests a job but also data such as a job name, a registration time of the job, an MFP name, and a setting place of the MFP can be set.

If the transmission setting for the job status (the transmission destination of the job status, the detailed setting of the job status, and the setting content of the transmission data of the job status) is decided by the processing explained above, the processor 11 registers transmission setting content of the job status concerning the job in the job table 18a in association with the job (ACT 22).

According to the processing, in the digital multifunction peripheral, the job and the transmission setting for the job status concerning the job are registered. According to the setting explained above, the job status can be transmitted by electronic mail to an arbitrary destination designated by the user. Since the job status is transmitted by electronic mail, the transmission destination only has to be an apparatus that can receive an electronic mail. In other words, the job status transmitted by electronic mail can also be received by an apparatus in which a printer driver or the like is not installed.

As the transmission destination of the job status, an arbitrary user other than the user himself or herself can be designated. Plural destinations can be set as transmission destinations. As the job status transmitted to the designated destination, items that should be notified are set by the user. The job status transmitted to the designated destination is transmitted to the designated destination as an electronic mail attached with set data.

The detailed setting processing for the job status is explained below.

Figure 4:
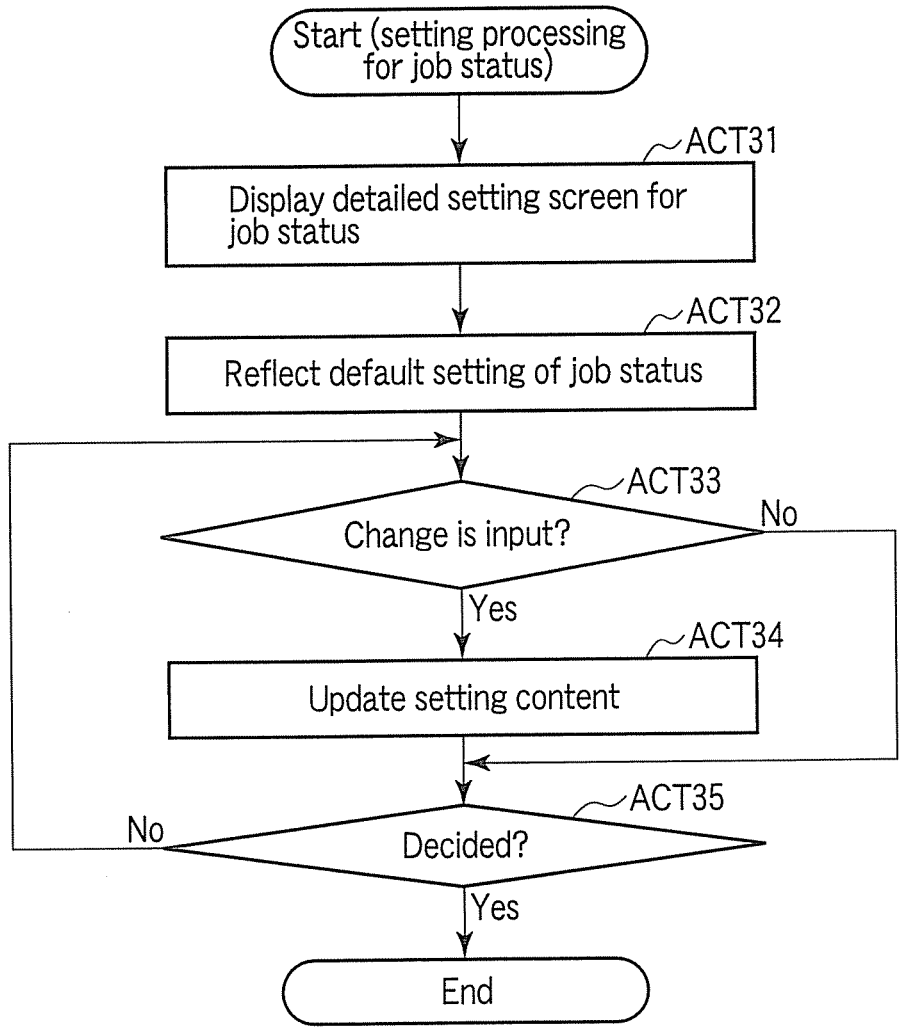
FIG. 4 is a flowchart for explaining an example of detailed setting processing for the job status.

FIG. 4 is a flowchart for explaining an example of the detailed setting processing for the job status.

In the detailed setting processing for the job status, the processor 11 of the system control unit 10 displays a detailed setting screen for the job status on the display unit 7a of the operation panel 7 (ACT 31). For example, the processor 11 of the system control unit 10 reads out default setting of the job status as an initial display state of the detailed setting screen for the job status and displays the detailed setting screen for the job status, on which the default setting is reflected, on the display unit 7a (ACT 32).

The default setting of the job status is stored in the status setting table 18c for each of types of jobs (copying, printing, scanning, etc.). For example, if detailed setting of a job status of the copying job is performed, the processor 11 displays detailed setting of the job status, on which default setting of the job status concerning the copying job is reflected, on the display unit 7a.

In a state in which the detailed setting screen for the job status is displayed on the display unit 7a, the user operates the operation panel 7 to thereby input setting content of the job status. For example, the user changes setting content on the detailed setting screen for the job status, on which the default setting is reflected, to thereby set setting content of the job status. If a change of the setting content of the job status is input (YES in ACT 33), the processor 11 updates the setting content of the job status (ACT 34).

The processor 11 receives the change of the setting content of the job status until decision of the setting content of the job status is instructed. If it is instructed to decide the detailed setting content of the job status (YES in ACT 35), the processor 11 decides the setting content of the job status.

FIG. 5 is a diagram of a display example of the detailed setting screen for the job status.

In the example shown in FIG. 5, as items (statuses) that can be set to be notified as the job status, there are "spooling", "job started (printing started)", "job completed (printing completed)", "sheet jam", "cover open", "lack of sheets", "lack of a toner", "interruption released (printing resumed)", "cancelling", "cancellation completed", "forcibly deleted", and the like. As setting contents concerning these items, in the display example of the detailed setting screen for the job status shown in FIG. 5, the processor 11 displays checkboxes for designating notification or non-notification concerning the items. These checkboxes are selectable by, for example, the touch panel 7b. The user instructs notification or non-notification concerning the setting items.

In the display example of the detailed setting screen for the job status shown in FIG. 5, the processor 11 displays an "OK key", a "cancel key", and a "default setting key". These keys are selectable by the touch panel 7b. The OK key instructs decision of setting content. The cancel key instructs cancellation of the setting content. The default setting key instructs storage of current setting content as default setting concerning the detailed setting of the job status.

For example, if "spooling" is set to "notify", the processor 11 transmits, as the job status, indication that the job is registered (spooled). If "spooling" is set to "not notify", the processor 11 does not notify that the job is registered (spooled). If "job started (printing started)" is set to "notify", when the job is started (executed), the processor 11 notifies the start of the job as the job status.

If "job completed (printing completed)" is set to "notify", when the job is completed, the processor 11 notifies the completion of the job as the job status.

If "sheet jam" is set to "notify", when the job is interrupted by a sheet jam, the processor 11 notifies the interruption of the job due to the sheet jam as the job status. If "cover open" is set to "notify", when the job is interrupted by cover open, the processor 11 notifies the interruption of the job due to the cover open as the job status. If "lack of sheets" is set to "notify", when the job is interrupted by lack of sheets, the processor 11 notifies the interruption of the job due to the lack of sheets as the job status. If "lack of a toner" is set to "notify", when the job is interrupted by lack of a toner, the processor 11 notifies the interruption of the job due to the lack of a toner as the job status.

If "interruption released" is set to "notify", when the interrupted job is resumed, the processor 11 notifies the resumption (interruption released) of the job as the job status. If "cancelling" is set to "notify", when cancellation of the job is instructed, the processor 11 notifies, as the job status, indication that processing for cancelling the job is started. If "cancellation completed" is set to "notify", when the cancellation of the job is completed, the processor 11 notifies, as the job status, indication that the cancellation of the job is completed. If "forcibly deleted" is set to "notify", when forcible deletion of the job is instructed, the processor 11 forcibly deletes the job.

As explained above, in the detailed setting processing for the job status, notification or non-notification can be set for each of the items of the statuses such as "spooling", "printing (printing started)", "printing completed", "interrupting", "interruption released", "cancelling", "cancellation completed", and "forcibly deleted". Further, notification or non-notification can be set for each of items such as "sheet jam", "cover open", "lack of sheets", and "lack of a toner", which are interruption causes during interruption. With the detailed setting processing for the job status, the user can set in detail statuses that the user desires to be notified.

The setting processing for the transmission data of the job status is explained below.

Figures 6, 7:
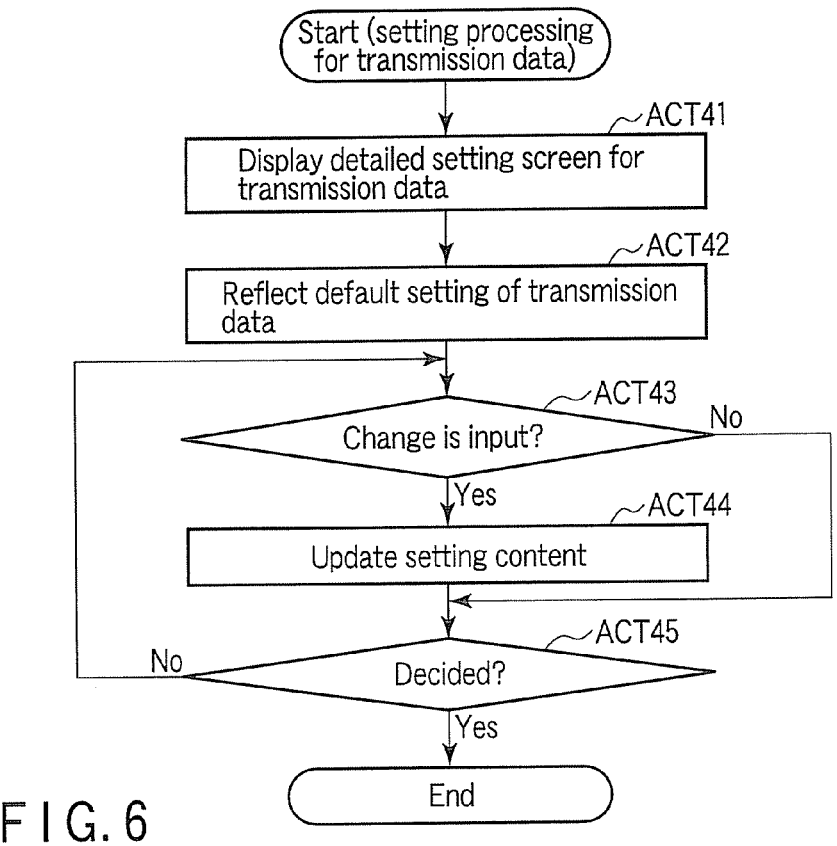
FIG. 6 is a flowchart for explaining an example of setting processing for transmission data of the job status.
FIG. 7 is a display example of a setting screen for transmission data of the job status.

FIG. 6 is a flowchart for explaining an example of the setting processing for the transmission data of the job status.

In the setting processing for the transmission data of the job status, the processor 11 of the system control unit 10 displays a setting screen for the transmission data of the job status on the display unit 7a of the operation panel 7 (ACT 41). For example, the processor 11 of the system control unit 10 displays, as an initial display state, a detailed setting screen for the job status, on which default setting of the transmission data of the job status is reflected, on the display unit 7a (ACT 42). The default setting of the transmission data of the job status is stored in the status setting table 18c for each of types of jobs (copying, printing, scanning, etc.). For example, if setting of transmission data of a job status concerning the copying job is performed, the processor 11 displays setting of the transmission data of the job status, on which default setting of the transmission data of the job status concerning the copying job is reflected, on the display unit 7a.

In a state in which the setting screen for the transmission data of the job status is displayed on the display unit 7a, the user operates the operation panel 7 to thereby input setting content of the transmission data. For example, the user changes setting content on the setting screen for the transmission data of the job status, on which the default setting is reflected, to thereby set setting content of the transmission data of the job status. If a change of the setting content of the transmission data is input (YES in ACT 43), the processor 11 updates the setting content of the transmission data of the job status (ACT 44). The processor 11 receives a setting change for the transmission data until decision of the setting content of the transmission data of the job status is instructed. If it is instructed to decide the setting content of the transmission data of the job status (YES in ACT 45), the processor 11 decides the setting content of the transmission data of the job status.

FIG. 7 is a diagram of a display example of the setting screen for the transmission data of the job status.

In the display example shown in FIG. 7, as data attached to the job status, there are "user name", "job name", "jog registration time", "MFP name", "MFP setting place", and the like. As setting contents concerning these data, in the display example of the setting screen shown in FIG. 7, the processor 11 displays checkboxes for designating "transmit" or "not transmit" concerning the data. These checkboxes are selectable by, for example, the touch panel 7b. The user instructs "transmit" or "not transmit" concerning the setting items.

In the display example of the setting screen for the transmission data shown in FIG. 7, the processor 11 displays an "OK key", a "cancel key", and a "default setting key". These keys are selectable by the touch panel 7b. The OK key instructs decision of setting content. The cancel key instructs cancellation of the setting content. The default setting key instructs to store current setting content as default setting.

For example, if "user name" is set to "transmit", the processor 11 transmits the job status with a user name of the job attached to the job status. If "user name" is set to "not transmit", the processor 11 transmits the job status without attaching the user name of the job to the job status. If "job name" is set to "transmit", the processor 11 transmits the job status with a job name of the job attached to the job status. If "job registration time" is set to "transmit", the processor 11 transmits the job status with a registration time of the job attached to the job status. If "MFP name" is set to "transmit", the processor 11 transmits the job status with "MFP name" indicating an MFP, which executes the job, attached to the job status. If "MFP setting place" is set to "transmit", the processor 11 transmits the job status with information indicating a setting place of the MFP, which executes the job, attached to the job status.

As explained above, in the setting processing for the transmission data of the job status, data such as "user name", "job name", "MFP name", and "MFP setting place" can be individually set as data attached to the job status. Further, as the transmission data attached to the job status, there is default setting. If the user does not select transmission data, transmission data of the default setting can be transmitted.

The transmission processing for the job status is explained below.

Figure 8:
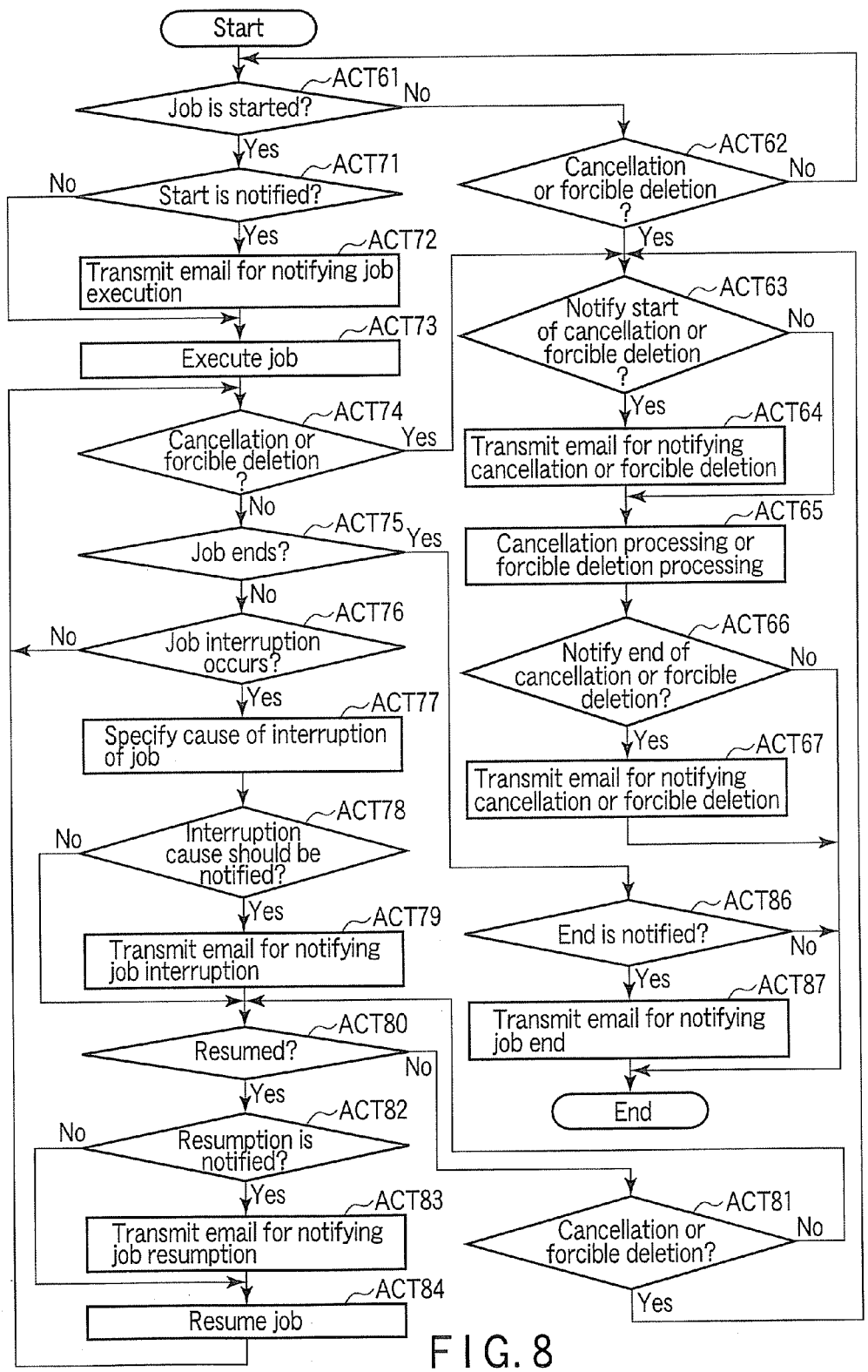
FIG. 8 is a flowchart for explaining an example of transmission processing for the job status.

FIG. 8 is a flowchart for explaining an example of the transmission processing for the job status.

The job table 18a stores jobs for which transmission setting for the job status is performed. The processor 11 sequentially executes jobs that satisfy execution conditions among the jobs registered in the job table 18a (ACT 61). For example, if there is a job being executed, the processor 11 starts the next job after the job being executed ends. Concerning a job for which an execution time is set, the processor 11 starts the job at timing when the execution time comes. Concerning a job for which notification of spooling is set, if the job is registered in the job table 18a, it is notified to an email address of a set transmission destination that the job is being spooled.

Until a job registered in the job table 18a is started (NO in Act 61), the processor 11 monitors whether cancellation or forcible deletion of the job is instructed (ACT 62).

If the cancellation of the job is instructed (YES in ACT 62), the processor 11 determines whether notification of cancelling is set as a job status concerning the job (Act 63). If the notification of cancelling is set (YES in ACT 63), the processor 11 creates, on the basis of setting content of transmission data of the job status concerning the job, an electronic mail including the job status indicating cancelling. The processor 11 transmits the created electronic mail indicating cancelling to an email address set as a transmission destination of the job status (ACT 64).

The processor 11 executes, according to an instruction for cancellation, processing for cancelling the job (ACT 65). If the cancellation ends, the processor 11 determines whether notification of cancellation end is set as a job status concerning the job (ACT 66). If the notification of cancellation end is set (YES in ACT 66), the processor 11 creates, on the basis of setting content of transmission data of the job status concerning the job, an electronic mail including the job status indicating cancellation end. The processor 11 transmits the created electronic mail indicating cancellation end to an email address set as a transmission destination of the job status (ACT 67).

If forcible deletion of a job is instructed (YES in ACT 62), the processor 11 determines whether notification of forcible deletion is set as a job status concerning the job (ACT 63). If the notification of forcible deletion is set (YES in ACT 63), the processor 11 creates, on the basis of setting content of transmission data of the job status concerning the job, an electronic mail including the job status indicating the start of forcible deletion. The processor 11 transmits the created electronic mail indicating the start of forcible deletion to an email address set as a transmission destination of the job status (ACT 64).

The processor 11 executes, according to an instruction for forcible deletion, processing for forcibly deleting the job (ACT 65). If the forcible deletion ends, the processor 11 determines whether notification of forcible deletion end is set as a job status concerning the job (ACT 66). If the notification of forcible deletion end is set (YES in ACT 66), the processor 11 creates, on the basis of setting content of transmission data of the job status concerning the job, an electronic mail including the job status indicating forcible deletion end. The processor 11 transmits the created electronic mail indicating forcible deletion end to an email address set as a transmission destination of the job status (ACT 67).

If a job registered in the job table 18*a* is started (YES in ACT 61), the processor 11 determines whether notification of the start of a job (e.g., printing) is set as a job status concerning the job (ACT 71). If the notification of job start is set (YES in ACT 71), the processor 11 creates, on the basis of setting content of transmission data of the job status concerning the job, an electronic mail including the job status indicating job start. The processor 11 transmits the created electronic mail indicating job start to an email address set as a transmission destination of the job status (ACT 72). The processor 11 starts execution of the job (ACT 73).

From the start of the job until the end of the job (NO in ACT 75), the processor 11 detects presence or absence of an instruction for cancellation and forcible deletion (ACT 74) and detects presence or absence of interruption of the job (ACT 76). If cancellation or forcible deletion is instructed (YES in ACT 74), the processor 11 returns to ACT 63 and performs cancellation or forcible deletion processing for the job and notification processing for cancellation or forcible deletion based on detailed setting content of the job status (ACTS 63 to 67).

If interruption of the job occurs (YES in ACT 76), the processor 11 specifies a cause of the interruption of the job on the basis of, for example, detection results of sensors set in the units in the digital multifunction peripheral 1 (ACT 77). If the cause of the interruption of the job is specified, the processor 11 determines whether the cause of the interruption of the job should be notified as a job status (ACT 78).

If it is determined that the cause of the interruption of the job should be notified as a job status (YES in ACT 78), the processor 11 creates, on the basis of setting content of transmission data of the job status concerning the job, an electronic mail including the job status indicating the interruption of the job and the cause of the interruption. The processor 11 transmits the created electronic mail indicating the interruption of the job and the cause of the interruption to an email address set as a transmission destination of the job status (ACT 79).

If the job is interrupted, the processor 11 monitors whether the job is resumed (ACT 80). Until the job is resumed (NO in ACT 80), the processor 11 monitors presence or absence of an instruction for cancellation or forcible deletion concerning the job (ACT 81). For example, if cancellation or forcible deletion is instructed in a state in which the job is interrupted (YES in ACT 81), the processor 11 returns to Act 63 and performs cancellation or forcible deletion of the job.

If the interrupted job is resumed (YES in ACT 80), the processor 11 determines whether notification of resumption (interruption release) of the job is set as a job status concerning the job (ACT 82). If the notification of interruption release is set (YES in ACT 82), the processor 11 creates, based on setting content of transmission data of the job status concerning the job, an electronic mail including the job status indicating the interruption release of the job. The processor 11 transmits the created electronic mail indicating the interruption release of the job to an email address set as a transmission destination of the job status (ACT 83). If the job status indicating the interruption release of the job is transmitted, the processor 11 resumes the job (ACT 84), returns to ACT 74, and performs the processing explained above.

If the job normally ends (YES in ACT 75), the processor 11 determines whether notification of end of the job is set as a job status concerning the job (ACT 86). If the notification of job end is set (YES in ACT 86), the processor 11 creates, on the basis of setting content of transmission data of the job status concerning the job, an electronic mail including the job status indicating the job end. The processor 11 transmits the created electronic mail indicating the job end to an email address set as a transmission destination of the job status (ACT 87).

As explained above, the digital multifunction peripheral determines whether start of a job, interruption of the job, resumption of the job, end of the job, cancellation of the job, forcible deletion of the job, and the like are notified on the basis of detailed setting of a job status designated by the user. The digital multifunction peripheral transmits, to an email address designated by the user, the job status to be notified. With the digital multifunction peripheral, it is possible to notify a status of a job designated by the user to an arbitrary email address by electronic mail. Since the job status is notified by electronic mail, it is unnecessary to install software such as a printer driver in an apparatus at a transmission destination. Therefore, it is possible to establish a system having high universality.

The digital multifunction peripheral 1 also has a user authentication function for authenticating a user.

The user authentication function collates user information input by a user and registration information registered in advance to thereby determine which registered person the user is. For example, the user authentication function collates a user ID and a password input to the operation panel 7 by the user and a registered user ID and a registered password of a registered person to thereby authenticate the user. It is assumed that registered person information of the registered person used for user authentication processing is stored in the HDD 18.

If a user can be specified by the user authentication function, the digital multifunction peripheral may set the transmission setting for a job status for each user (registered person) in advance. For example, transmission setting content of a job status for each user (an email address of a transmission destination, detailed setting of the job status, default setting of transmission data, etc.) are stored in the user setting table 18*e*. If a user is authenticated, it is possible to read out transmission setting for a job status concerning the authenticated user from the user setting table 18*e*.

Concerning each user, transmission setting content of a job status (an email address of a transmission destination, detailed setting of the job status, default setting of transmission data, etc.) may be stored for each type of a job in the user setting table 18*e*. With such a user setting table 18*e*, if user authentication is successful and content of a job is decided, the processor 11 can read out transmission content of a job status corresponding to the user and the job content from the user setting table 18*e*.

FIG. 9 is an example of data stored in the user setting table 18*e*.

In the example shown in FIG. 9, transmission setting contents of job statuses associated with users and job contents are stored in the user setting table 18*e*. For example, in the example shown in FIG. 9, if a user A selects color copying, "aaaaa" and "bbbbbbb" are set as transmission destinations and "default setting" is set as detailed setting of a job status and setting content of transmission data. If the user A selects monochrome copying, "ccccc" and "bbbbbbb" are set as transmission destinations and "default setting" is set as detailed setting of a job status and setting content of transmission data.

If a user is specified by user authentication, setting information of a job status such as an email address of a transmission destination may be stored in the HDD 18 as history information (a transmission history) associated with the user. FIG. 10 is a diagram of an example of the history information stored in the HDD 18. In the example shown in FIG. 10, registration date and time of a job, an email address of a destination, and setting content are stored in association with a user name.

Figure 11:
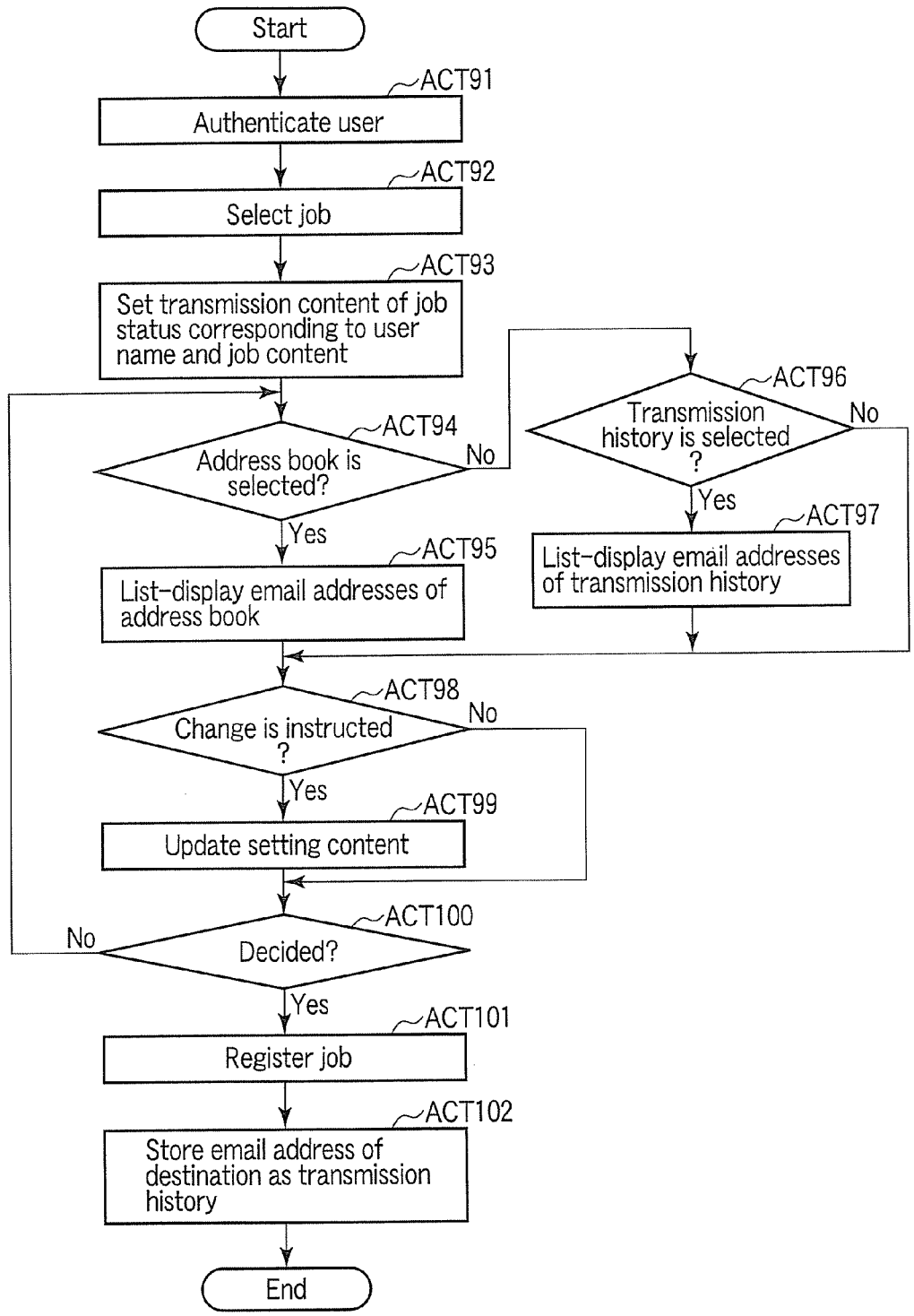
FIG. 11 is a flowchart for explaining a flow of transmission setting processing for a job status performed when user authentication is successful.

FIG. 11 is a flowchart for explaining a flow of transmission setting processing for a job status performed when user authentication is successful.

First, it is assumed that a user inputs user information with the operation panel 7. Then, the processor 11 of the system control unit 10 collates the user information input by the user and registered person information stored by the HDD 18 to thereby perform user authentication processing (ACT 91). If the user authentication is successful, the processor 11 displays an operation menu for the user on the display unit 7*a*. If the user authentication is unsuccessful, the processor 11 may display indication that the user authentication is unsuccessful on the display unit 7*a*. In this explanation, it is assumed that the user authentication is successful.

If the user successful in the authentication selects desired processing content (job) with the operation panel 7 (ACT 92), the processor 11 of the system control unit 10 reads out transmission setting content of a job status corresponding to the user successful in the authentication and content of the selected job from the user setting table 18*e* and performs transmission setting for the job status (ACT 93). For example, in the example shown in FIG. 9, if the user successful in the authentication is the user A and job content selected by the user A is the color copying, the processor 11 sets "aaaaa" and "bbbbbbb" as transmission destinations and sets "default setting" as detailed setting of the job status and setting content of transmission data.

The processor 11 receives, according to operation of the operation panel 7 by the user, a change of the transmission setting for the job status. For example, if an email address of a transmission destination is added, the user inputs, with the operation panel 7, the email address to be added. If an email address is added or changed, the user can refer to email addresses of an address book or a transmission history.

If the user selects the address book (YES in ACT 94), the processor 11 list-displays email addresses to be stored in an address book of the user on the display unit 7*a* (ACT 95). The email addresses list-displayed from the address book can be designated as transmission destination of the job status by the touch panel 7*b*. As the address book, the address book of the user may be selected.

If the user selects the transmission history (YES in ACT 96), the processor 11 displays, on the display unit 7*a*, a list of email addresses of transmission destinations designated by the user in the past and stored in transmission history (ACT 97). The email addresses list-displayed from the transmission history can be designated as transmission destination of the job status by the touch panel 7*b*.

If an instruction for changing the setting content of the job status is received (YES in ACT 98), the processor 11 changes the transmission setting for the job status according to an instructed change of the setting content (ACT 99). If the user decides the transmission setting for the job status (YES in ACT 100), the processor 11 registers the job and the transmission setting for the job status concerning the job in the job table 18*a* (ACT 101). An email address set as a destination of the job status is stored in the setting history database 18*f* of the HDD 18 as history information in association with a user name (ACT 102).

According to the processing explained above, the digital multifunction peripheral sets, from existing setting contents stored in the user setting table 18*e* in advance, a job status concerning a job selected by a user successful in user authentication. A user who executes authentication processing can set a job status corresponding to content of a job on the basis of the existing setting contents.

Transmission setting for a job status concerning a job that the user terminal 2 requests the digital multifunction peripheral 1 to perform is explained below.

FIG. 12 is a diagram for schematically explaining a flow of transmission processing for a job status concerning a job that the user terminal 2 requests the digital multifunction peripheral 1 to perform.

First, it is assumed that the user terminal 2 performs user authentication processing (ACT 111). For example, the user authentication processing may be executed when a printer driver is started. Login processing for a user during the start of the user terminal 2 may be performed as the user authentication processing.

In the user terminal 2, the processor 21 can request, by executing a printer driver for the digital multifunction peripheral 1, the digital multifunction peripheral 1 to perform a job such as printing. Specifically, the user terminal 2 designates job content according to operation by the user (ACT 112). For example, the processor 21 of the user terminal 2 determines a job for requesting the digital multifunction peripheral 1 to perform print processing for printing data (image data) designated by the user.

If the job for requesting the digital multifunction peripheral 1 to perform is determined, the processor 21 of the user terminal 2 performs transmission setting processing for a job status (ACT 113). As the transmission setting processing for a job status, the user terminal 2 performs, for example, setting of an email address as a transmission destination of a job status, detailed setting of the job status, and setting of transmission data of the job status concerning the job requested to the digital multifunction peripheral 1. However, if the user does not desire transmission of a job status, the user terminal 2 omits the processing in ACT 113.

If the transmission setting processing for a job status ends, the user terminal 2 transmits job data for requesting a job to the digital multifunction peripheral 1 via the network. The job data is data including, for example, printing data, transmission setting content of the job status, and a user name.

The digital multifunction peripheral 1 receives the job data supplied from the user terminal 2 (ACT 121). The digital multifunction peripheral 1 registers the job and the transmission setting contents of the job status included in the received job data in the job table 18*a* (ACT 122). The digital multifunction peripheral 1 stores the transmission setting content of the job status such as an email address of the job status in the setting history database 18*f* as a transmission history (a setting history) of the job status associated with the user name included in the job data (ACT 123).

If the job is registered in the job table 18*a*, the digital multifunction peripheral 1 performs execution of the job registered in the job table 18*a* and transmission processing for the job status according to the processing shown in FIG. 8 (ACTS 124 to 126). In FIG. 12, a part of processing included in the execution of the job registered in the job table 18*a* and the transmission processing for the job status is described.

In an example shown in FIG. 12, if execution conditions for the job registered in the job table 18a are satisfied, the digital multifunction peripheral 1 starts the job (ACT 124). The digital multifunction peripheral 1 detects, concerning the job registered in the job table 18a, a status that should be notified according to the transmission setting content of the job status (ACT 125). If the status that should be notified is detected, the digital multifunction peripheral 1 creates an electronic mail for notifying the status, sets an email address designated by the transmission setting for the job status in the created electronic mail, and transmits the electronic mail to the mail server 4 (ACT 126).

The mail server 4 delivers the electronic mail including the job status received from the digital multifunction peripheral 1 to the set email address (ACT 131).

Transmission setting processing for a job status concerning a job requested to the digital multifunction peripheral 1 in the user terminal 2 is explained below.

Figure 13:
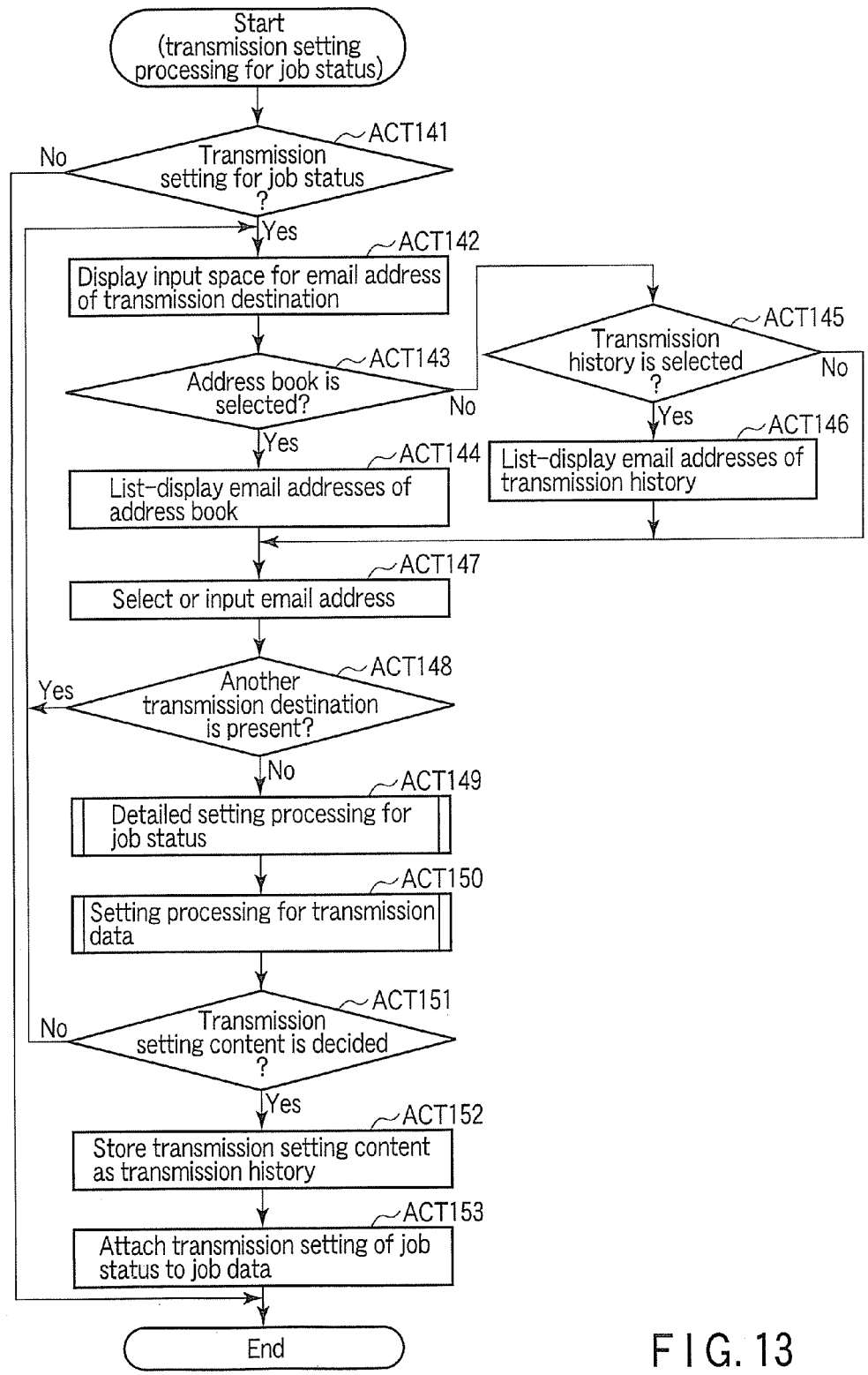
FIG. 13 is a flowchart for explaining transmission setting processing for a job status by the user terminal.

FIG. 13 is a flowchart for explaining an example of the transmission setting processing for a job status concerning a job requested to the digital multifunction peripheral 1 in the user terminal 2.

First, it is assumed that the user terminal 2 starts the printer driver executed by the processor 21 and designates a job requested to the digital multifunction peripheral 1. If the user desires notification of a job status concerning the job requested to the digital multifunction peripheral 1, the user selects transmission setting for the job status with the operation unit 27 of the user terminal 2. If the transmission setting for the job status is selected (YES in ACT 141), first, as setting processing for a transmission destination of the job status, the processor 21 of the user terminal 2 displays an input space for an email address set as a transmission destination on the display unit 26 (ACT 142). Plural input spaces for email addresses may be displayed on the display unit 26. In the input space for an email address, an email address set in default for the user may be displayed in a default state.

The processor 21 enables the user to select, with the operation unit 27, an address book or a transmission history together with the input space for an email address of a transmission destination. If the address book is selected by the operation unit 27 (YES in ACT 143), the processor 21 displays a list of email addresses stored in the address book on the display unit 26 (ACT 144). If the transmission history is selected by the operation unit 27 (YES in ACT 145), the processor 21 displays a list of email addresses stored as the transmission history on the display unit 26 (ACT 146). The user can select, with the operation unit 27, the email addresses displayed as a list on the display unit 26.

Specifically, the user selects an email address to be set as a transmission destination of the job status from the email address list-displayed on the display unit 26 or directly inputs the email address in the input space for an email address. The processor 21 sets the email address selected or input by the user as a transmission destination of the job status (ACT 147). The job status can be transmitted to plural destinations. If there is another transmission destination (the next transmission destination) as the transmission destination of the job status (YES in ACT 148), the processor 21 returns to ACT 142 and performs setting processing for an email address to be set as the next transmission destination. In other words, the processor 21 repeatedly executes ACTS 142 to 148 to thereby set email addresses concerning all transmission destinations.

If the setting processing for a transmission destination of the job status ends, the processor 21 performs detailed setting processing for the job status (ACT 149). In the detailed setting processing for the job status, the processor 21 sets in detail, for example, items that should be transmitted as the job status. As items that can be set as the job status, presence or absence of notification concerning not only job completion (printing completion) but also job start (printing start), job interruption (printing interruption) interruption release (printing resumption), cancellation, and forcible deletion can be set. The detailed setting processing for the job status may be a processing procedure same as the processing shown in FIG. 4. In other words, the processor 21 of the user terminal 2 can carry out the detailed setting processing for the job status by executing the processing shown in FIG. 4 with the printer driver.

If the detailed setting of the job status ends, the processor 21 performs setting processing for transmission data of the job status (ACT 150). In the setting processing for transmission data, the processor 21 sets data and the like attached to the job status. As the data attached to the job status, attachment of not only a name of a user who requests a job but also data such as a job name, a registration time of the job, an MFP name, and a setting place of the MFP can be set. The setting processing for transmission data of the job status may be a processing procedure same as the processing shown in FIG. 6. In other words, the processor 21 of the user terminal 2 can carry out the setting processing for transmission data of the job status by executing the processing shown in FIG. 6 with the printer driver.

If the transmission setting for the job status (the transmission destination of the job status, the detailed setting of the job status, and the setting content of the transmission data of the job status) is decided by the processing explained above (YES in ACT 151), the processor 21 stores transmission setting content of the job status concerning the job in the setting history table 24f as a transmission history in association with the job (ACT 152). The processor 21 attaches, as information included in job data, the transmission setting content of the job status to printing data or the like (ACT 153) and transmits the transmission setting content to the digital multifunction peripheral 1.

As explained above, the user terminal 2 performs transmission setting for a job status concerning a job requested to the digital multifunction peripheral. The user terminal 2 transmits the transmission setting content of the job status to the digital multifunction peripheral as job data attached to print data requested to be printed. According to the setting explained above, in the user terminal, the user can designate an arbitrary electronic mail address as a transmission destination of the job status. As a result, the image forming system can transmit the job status of the job requested to the digital multifunction peripheral by email. Various apparatuses that can receive electronic mails can be set as transmission destinations of the job status.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a job registering unit configured to register a job;
   an address setting unit configured to set an email address to be set as a transmission destination of a status concerning the job registered in the job registering unit;

a control unit configured to execute the job registered in the job registering unit;
a status setting unit configured to set, for each cause of an interruption, whether the interruption of the job is notified,
a detecting unit configured to detect the status concerning the job executed by the control unit; and
a transmitting unit configured to transmit, if the detecting unit detects the interruption of the job and if a cause of the interruption of the job is a cause of the interruption of the job to be notified, an electronic mail including information indicating the interruption of the job and the cause of the interruption to the email address set by the address setting unit.

2. The apparatus of claim 1, further comprising an address book in which email addresses that can be set as transmission destinations of the status concerning the job are stored, wherein
the address setting unit selects the email address to be set as the transmission destination of the status from the address book.

3. The apparatus of claim 1, further comprising a history storing unit configured to store email addresses set as transmission destinations of the status concerning the job, wherein
the address setting unit selects the email address to be set as the transmission destination of the status from the email addresses stored in the history storing unit.

4. The apparatus of claim 1, wherein
the address setting unit sets plural email addresses, and
the transmitting unit transmits an electronic mail including the status to the plural email addresses input by an operation unit.

5. The apparatus of claim 1, further comprising a user authentication unit configured to perform user authentication processing, wherein
the address setting unit sets an email address associated with a user if the user is specified by the user authentication processing.

6. An image forming apparatus comprising:
a job registering unit configured to register a job;
an address setting unit configured to set an email address to be set as a transmission destination of a status concerning the job registered in the job registering unit;
a control unit configured to execute the job registered in the job registering unit;
a status setting unit configured to set whether cancellation of the job is notified,
a detecting unit configured to detect the status concerning the job executed by the control unit; and
a transmitting unit configured to transmit, if the detecting unit detects the cancellation of the job to be notified, an electronic mail including information indicating the cancellation of the job to the email address set by the address setting unit.

7. The apparatus of claim 6, further comprising an address book in which email addresses that can be set as transmission destinations of the status concerning the job are stored, wherein
the address setting unit selects the email address to be set as the transmission destination of the status from the address book.

8. The apparatus of claim 6, further comprising a history storing unit configured to store email addresses set as transmission destinations of the status concerning the job, wherein
the address setting unit selects the email address to be set as the transmission destination of the status from the email addresses stored in the history storing unit.

9. The apparatus of claim 6, wherein
the address setting unit sets plural email addresses, and
the transmitting unit transmits an electronic mail including the status to the plural email addresses input by an operation unit.

10. The apparatus of claim 6, further comprising a user authentication unit configured to perform user authentication processing, wherein
the address setting unit sets an email address associated with a user if the user is specified by the user authentication processing.

11. An image forming apparatus comprising:
a job registering unit configured to register a job;
an address setting unit configured to set an email address to be set as a transmission destination of a status concerning the job registered in the job registering unit;
a control unit configured to execute the job registered in the job registering unit;
a detecting unit configured to detect the status concerning the job executed by the control unit;
an operation unit configured to instruct data to be transmitted while being attached to the status;
a storing unit configured to store default setting of the data to be transmitted while being attached to the status;
a transmission-data setting unit configured to set the data instructed by the operation unit as the data transmitted while being attached to the status, and if there is no instruction by the operation unit, the data to be transmitted while being attached to the status according to the default setting stored in the storing unit; and
a transmitting unit transmits an electronic mail in which the data set by the transmission-data setting unit is attached to information indicating the status of the job detected by the detecting unit to the email address set by the address setting unit.

12. The apparatus of claim 11, further comprising an address book in which email addresses that can be set as transmission destinations of the status concerning the job are stored, wherein
the address setting unit selects the email address to be set as the transmission destination of the status from the address book.

13. The apparatus of claim 11, further comprising a history storing unit configured to store email addresses set as transmission destinations of the status concerning the job, wherein
the address setting unit selects the email address to be set as the transmission destination of the status from the email addresses stored in the history storing unit.

14. The apparatus of claim 11, wherein
the address setting unit sets plural email addresses, and
the transmitting unit transmits an electronic mail including the status to the plural email addresses input by an operation unit.

15. The apparatus of claim 11, further comprising a user authentication unit configured to perform user authentication processing, wherein
the address setting unit sets an email address associated with a user if the user is specified by the user authentication processing.

* * * * *